United States Patent
Schmidt

[11] Patent Number: 6,147,504
[45] Date of Patent: Nov. 14, 2000

[54] ROD-SHAPED CAPACITIVE PROBE HAVING SHEET-LIKE ELECTRODE

[75] Inventor: Robert Schmidt, Steinen, Germany

[73] Assignee: Endress + Hauser GmbH + Co., Maulburg, Germany

[21] Appl. No.: 09/204,880

[22] Filed: Dec. 3, 1998

[30] Foreign Application Priority Data

Dec. 24, 1997 [EP] European Pat. Off. ............. 97122872

[51] Int. Cl.⁷ .......................... G01R 27/26; G01R 27/32
[52] U.S. Cl. ............................................. 324/690; 324/448
[58] Field of Search .................................. 324/658, 686, 324/688, 689, 690, 446, 448, 449; 73/304 C, 866.5; 524/277; 528/272, 308

[56] References Cited

U.S. PATENT DOCUMENTS

| | | | |
|---|---|---|---|
| 4,245,188 | 1/1981 | Rottmar | 73/304 C |
| 4,377,912 | 3/1983 | Hakhverdian | 33/366 |
| 4,412,270 | 10/1983 | Weitz, Jr. et al. | 361/284 |
| 4,551,785 | 11/1985 | Kröner | 361/284 |
| 4,555,941 | 12/1985 | Fathauer et al. | 73/304 C |
| 4,757,252 | 7/1988 | Maltby et al. | 324/687 |
| 5,039,727 | 8/1991 | Onishi et al. | 524/277 |
| 5,391,839 | 2/1995 | Lang et al. | 174/65 R |
| 5,423,214 | 6/1995 | Lee | 73/304 C |
| 5,757,196 | 5/1998 | Wetzel | 324/688 |

FOREIGN PATENT DOCUMENTS

| | | |
|---|---|---|
| 0 763 723 | 3/1997 | European Pat. Off. . |
| 27 44 820 | 4/1979 | Germany . |
| 33 28 210 | 2/1985 | Germany . |
| 195 36 198 | 4/1997 | Germany . |
| WO 92/21943 | 12/1992 | WIPO . |

*Primary Examiner*—Safet Metjahic
*Assistant Examiner*—Anjan K Deb
*Attorney, Agent, or Firm*—Bose McKinney & Evans LLP

[57] ABSTRACT

A robust probe (1) which can be installed simply and without special tools and can be produced at low cost is provided, said probe having an essentially rod-shaped probe housing (2), which has an axial, conical interior space, and a clamping cone (10), which is compressible in the radial direction, is arranged in the interior space and on which there is arranged at least one sheet-like electrode (11, 12, 13), which is pressed by the clamping cone (10) against a wall of the probe housing (2) such that said electrode is in surface contact and there are no gaps.

14 Claims, 3 Drawing Sheets

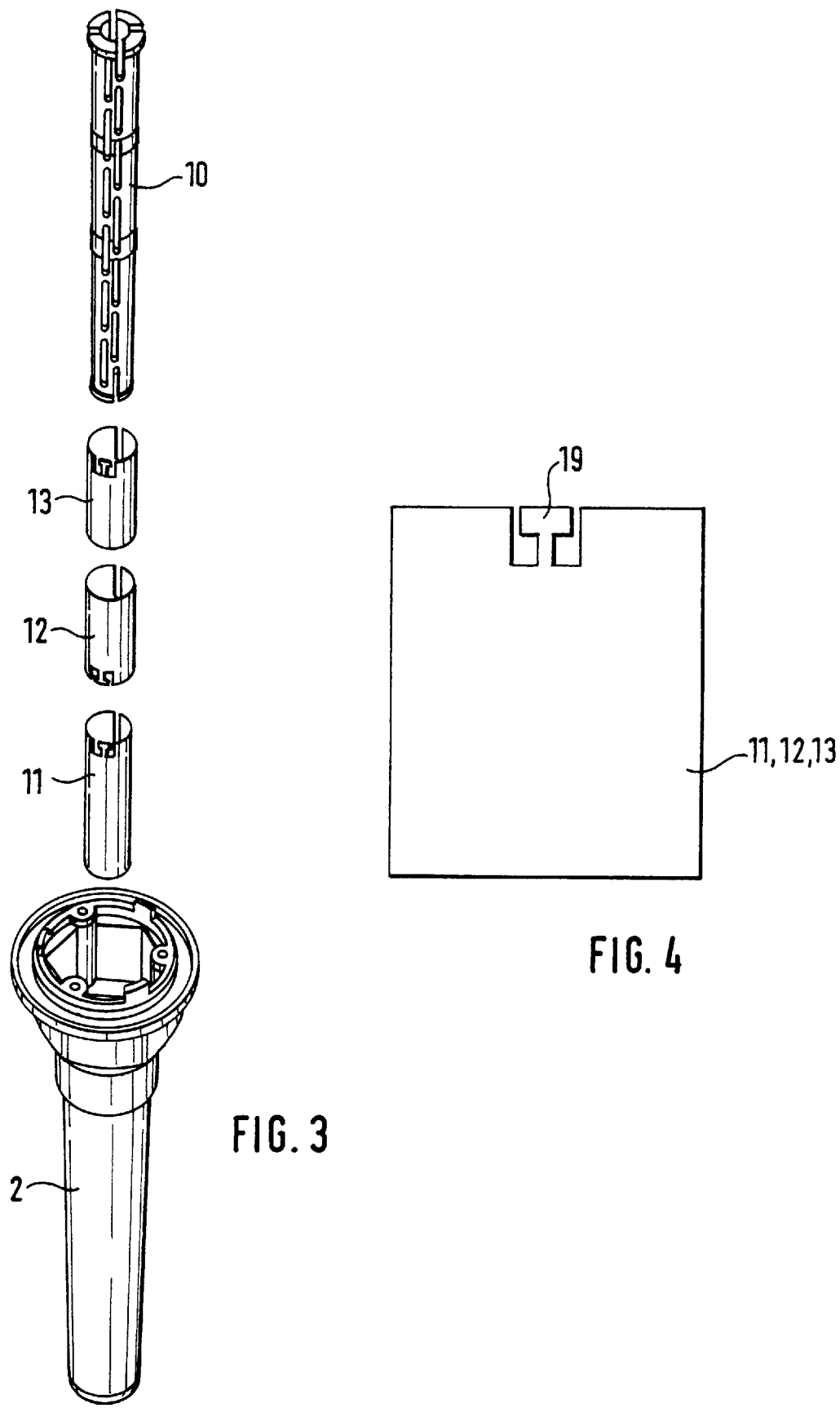

ROD-SHAPED CAPACITIVE PROBE HAVING SHEET-LIKE ELECTRODE

FIELD OF THE INVENTION

The invention relates to a probe having an essentially rod-shaped probe housing which has an axial, conical interior space, in which at least one sheet-like electrode is arranged.

BACKGROUND OF THE INVENTION

Such probes are routinely used in conjunction with measuring instruments. For example, capacitive filling-level limit switches typically have a probe with at least one electrode arranged therein. The measuring instrument is arranged, for example, at the height of a predetermined filling level. An electrode serving as a measuring electrode forms a component part of a measuring capacitor, the capacitance of which depends on whether or not the probe is covered by a filling medium. The counterelectrode is formed by a separate electrode, arranged outside the probe, or by a wall of the vessel in which the probe is arranged.

Capacitive filling-level limit switches often have a second electrode, namely a shielding electrode. The shielding electrode is kept constantly at the same AC voltage potential as the measuring electrode. This prevents disturbing influences, such as contamination or built-up deposits, having an effect on the capacitance of the measuring electrode and consequently on the measurement result.

A capacitive switch of this type is described, for example, in DE-A 195 36 198.

Capacitive filling-level limit switches may additionally have a third electrode. This may likewise serve as a counterelectrode and is preferably designed as a ground electrode, in that it is connected to a ground potential or to a neutral point of a circuit of the limit switch.

DE-C 27 44 820 describes a probe having
an essentially rod-shaped probe housing,
which has an axial interior space,
in which a sheet-like electrode is arranged.

The probe described there is produced by initially encapsulating a metal tube in a layer of plastic on the inside and outside by injection molding. A probe electrode is connected to a metal wire and pushed onto an insulator. The insulator is subsequently screwed onto a threaded portion of the metal tube and the entire arrangement is encapsulated in plastic.

The production of this probe comprises many working steps and, due among other reasons to the injection-molding operation required twice, is complex and costly.

DE-C 33 28 210 likewise describes a probe having
an essentially rod-shaped probe housing,
which has an axial interior space,
in which a sheet-like electrode is arranged.

The probe housing described comprises a tubular main part and a cup-shaped cap. Three electrodes are arranged in the interior of the housing. A first electrode has the form of a flat pot fitted snugly in the cap and serves as a measuring electrode. A second electrode and a third electrode are respectively tubular and serve as a shielding electrode and a ground electrode. The electrodes are spaced apart from one another and electrically insulated with respect to one another in the housing by spacers. The two housing parts, the main part and the cap are securely connected to each other by ultrasonic welding.

Although the two-part housing means that it is possible to dispense with encapsulation of the electrodes, instead the housing parts must be connected to each other in a sealed manner. The connection is complex and will always represent a mechanical weakness.

In the case of the two prior-art probes described above, electrodes are stable components which at least partially lend the housing its mechanical strength.

BRIEF SUMMARY OF THE INVENTION

It is an object of the invention to specify a probe which is robust, can be installed simply and without special tools and can be produced at low cost.

This object is achieved according to the invention by a probe having
an essentially rod-shaped probe housing,
which has an axial, conical interior space,
a clamping cone which is compressible in the radial direction and
is arranged in the interior space and
on which there is arranged at least one sheet-like electrode,
which is pressed by the clamping cone against a wall of the probe housing such that said electrode is in surface contact and there are no gaps.

According to one embodiment, the clamping cone has an axial cylindrical bore and clearances which run in the longitudinal direction of the cone and penetrate a wall of the clamping cone and by which the clamping cone is compressible in the radial direction.

According to a further embodiment, each end face of the clamping cone is broken through by at least one clearance.

According to a further embodiment, the electrodes are bent metal plates, in particular made of brass, bronze or some other copper alloy, which adhere to the clamping cone by their resilience alone.

The electrodes can be electrically connected by means of a lead passed through the bore of the clamping cone and preferably have a portion which can be fastened on an insulated conductor of the lead by crimping.

According to a further embodiment, the probe housing consists of a chemically highly resistant material which can be used in a wide temperature range, in particular of polyphenylene sulfide (PPS) or of polybutylene terephthalate (PBT), and the clamping cone consists of a rigid plastic, in particular of a polyester, for example polybutylene terephthalate (PBT), or a polyamide.

According to one embodiment, a first electrode is a measuring electrode, a second electrode is a shielding electrode and a further electrode is a ground electrode of a capacitive filling-level limit switch.

According to a further embodiment, a coaxial lead with an inner conductor and an outer conductor is provided and the measuring electrode is connected to the inner conductor and the shielding electrode is connected to the outer conductor.

BRIEF DESCRIPTION OF THE DRAWINGS

The invention and its advantages are now explained in more detail with reference to the figures of the drawing, in which an exemplary embodiment is represented; identical elements are provided with the same reference numerals in the figures.

FIG. 3 shows an exploded view of the probe housing, of the clamping cone and of the electrodes from FIG. 1; and FIG. 4 shows a base area of an electrode.

DETAILED DESCRIPTION OF EXEMPLARY EMBODIMENTS

Figure 1:
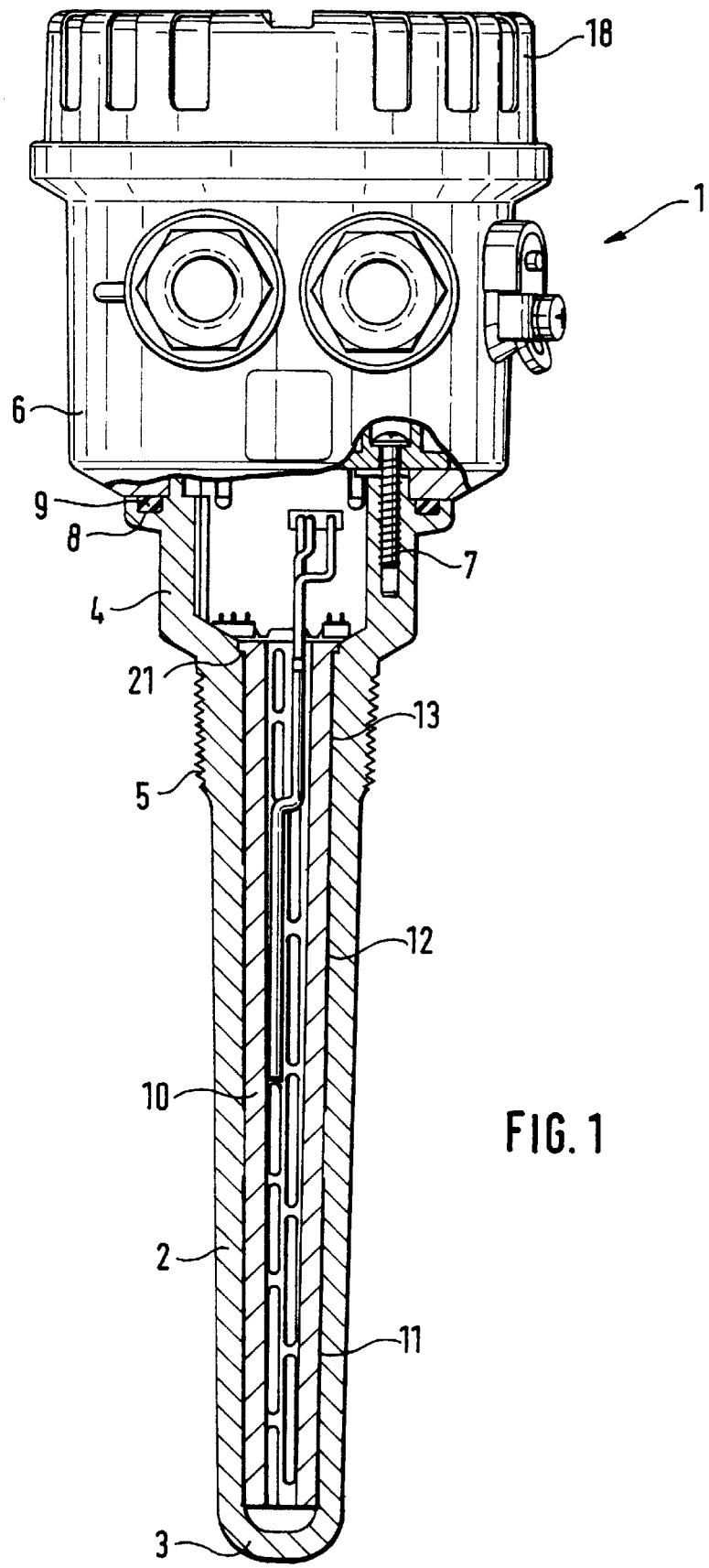
FIG. 1 shows a partially sectional view of a probe.

The exemplary embodiment of a probe 1 according to the invention represented in FIG. 1 has an essentially rod-shaped probe housing 2 with an axial, conical interior space. The probe housing 2 has a first, closed end 3 and a second, open end 4. The interior space is accessible through the open end 4. Arranged on the probe housing 2 near the open end 4 is an external thread 5, by means of which the probe 1 can be fastened at a measuring location. It goes without saying that other types of fastening, for example by means of a flange formed onto the probe housing 2, can also be used.

The open end 4 is closed by a further housing 6, which serves, for example, for receiving probe electronics. As shown in FIG. 1, the housing 6 is fastened by means of screws 7. The screws 7 are screwed into the probe housing 2 through a wall of the housing 6 facing the probe housing. On an end face of the probe housing 2 facing the housing 6 there is provided a groove 8 for receiving a seal 9, by which an intermediate space between the housing 6 and the probe housing 2 is sealed off. The housing 6 has on its side facing away from the probe housing an opening which can be closed by a cover 18 and through which the interior space of the housing 6 and the screws 7 are accessible.

The probe housing 2 preferably consists of a chemically highly resistant material which can be used in a wide temperature range, in particular of polyphenylene sulfide (PPS) or of polybutylene terephthalate (PBT). Polyphenylene sulfide (PPS) offers the advantage of a very high temperature resistance. It can even be used at temperatures of 200° C. and above.

A clamping cone 10, which is compressible in the radial direction, is arranged in the interior space of the probe housing 2. In the installed state, the interior space and the clamping cone 10 are of an identical shape and the outside diameter of the clamping cone 10 decreases in the direction away from the housing.

At least one sheet-like electrode is arranged on the clamping cone 10. In the exemplary embodiment shown, three sheet-like electrodes 11, 12, 13 are arranged one above the other. The electrodes 11, 12, 13 are pressed by the clamping cone 10 against a wall of the probe housing 2 such that they are in surface contact and there are no gaps. The electrodes 11, 12, 13 are bent metal plates, in particular made of brass, bronze or some other copper alloy. The electrodes 11, 12, 13 are produced by electrodes of a quadrangular base area being punched out from a metal plate and subsequently rolled until they assume the desired shape. The base area of an electrode is shown in FIG. 4. If, as shown in FIG. 4, an electrode with a rectangular base area is used, edges opposite one another on the clamping cone 10 are inclined with respect to one another in the installed state, in the case of an electrode of a trapezoidal crosssection these edges running correspondingly parallel to one another.

If the probe is used in the case of a capacitive filling-level limit switch, the first electrode 11, for example, serves as a measuring electrode. The second electrode 12 may be provided as a shielding electrode and the third electrode 13 may be used as a ground electrode.

The shielding electrode is kept constantly at the same AC voltage potential as the measuring electrode. This prevents disturbing influences, such as contamination or built-up deposits for example, from having an effect on the capacitance of the measuring electrode and consequently on the measurement result.

The size and number of the electrodes can be freely chosen according to the application and is restricted only by the dimensions of the clamping cone 10.

Figure 2:
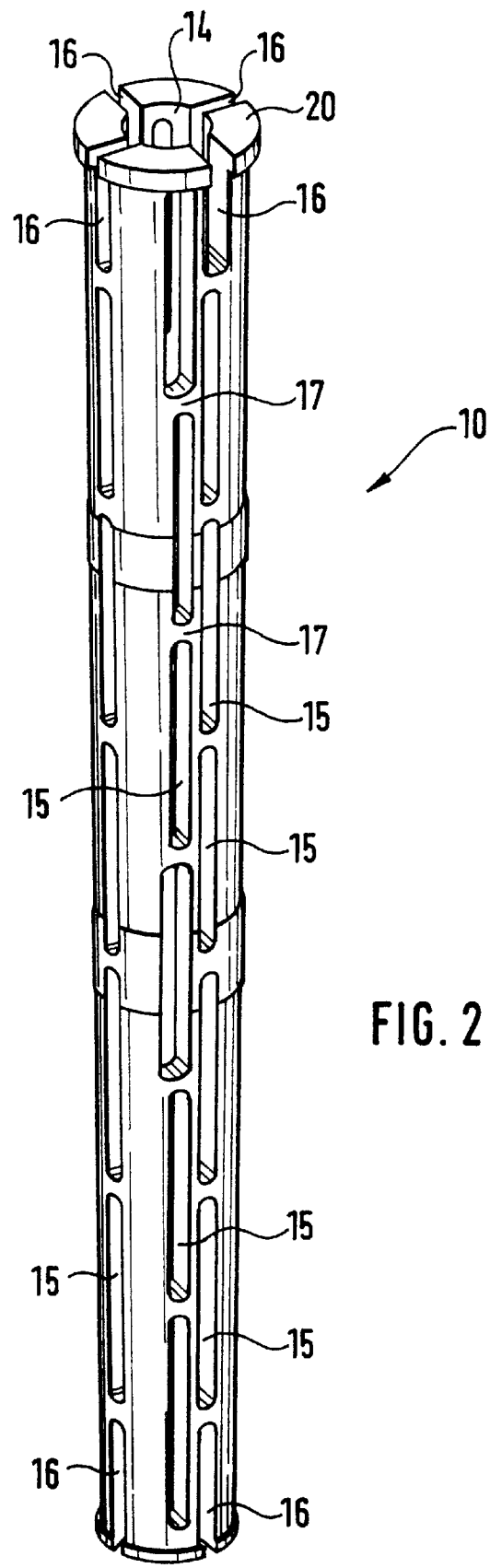
FIG. 2 shows a perspective view of the clamping cone from FIG. 1.

FIG. 2 shows a view of the clamping cone 10. The latter has an axial cylindrical bore 14 and clearances 15, 16, which run in the longitudinal direction of the cone and penetrate a wall of the clamping cone 10. Each end face of the clamping cone 10 is broken through by at least one clearance 16. The bore 14 and the clearances 15, 16 have the effect that the clamping cone 10 is compressible in the radial direction.

The clamping cone 10 preferably consists of a rigid, but not brittle plastic, in particular of a polyester, for example polybutylene terephthalate, or of a polyamide. In conjunction with the geometry of the clamping cone 10, these materials have resilient properties.

The clearances 15, 16 are arranged symmetrically in the clamping cone 10. They have in each case the form of a gap. A web 17 runs between clearances 15, 16 adjoining one another at the ends.

In the exemplary embodiment represented, the clearances 15, 16 are arranged in four groups distributed uniformly around the clamping cone 10. Each group comprises two rows of clearances 15, 16 arranged parallel to one another and parallel to the longitudinal axis of the cone. The neighboring rows are arranged offset with respect to one another in such a way that each web 17 is respectively located level with the center of the clearance 15 of the neighboring row running parallel to it. A wall strip of the clamping cone 10 respectively running between the two rows has a small width and is therefore flexible. A force acting on the outer lateral surface of the clamping cone 10 has the effect of compressing it. The wall strips thereby undergo flexure and the size of the clearances 15, 16 decreases.

The clearances 15, 16 have the effect that the clamping cone 10 is compressible, even though it consists of a material which in fact is scarcely elastically deformable at all. This combines the advantages of a rigid, stable material with those of an elastic material, namely its deformability.

Materials with the same or virtually the same coefficients of thermal expansion are preferably used for the clamping cone 10 and the probe housing 2. This ensures that the two components undergo the same thermal expansion.

The outside dimensions of the clamping cone 10 in the unloaded state, i.e. when no force is acting on it, are set such that it is slightly larger than the interior space of the probe housing 2. A clamping cone 10 which has a length of, for example, 160 mm, the smallest diameter of which in the unloaded state is 13.3 mm and the largest diameter of which in the unloaded state is 16.3 mm may, for example, be arranged in a probe housing 2 of which the interior space has over the entire length of the clamping cone 10 a diameter which is 0.3 mm smaller than the corresponding outside diameter of the clamping cone 10 in the unloaded state.

On account of the compressibility of the clamping cone 10, production tolerances are far less critical than is the case with probes in which the electrodes must be fitted exactly into a housing. Gaps caused by tolerances do not occur in the first place, but are instead compensated directly by the compressible clamping cone 10.

Since the mechanical stability of the probe 1 is ensured by the probe housing 2 and the clamping cone 10, the electrodes 11, 12, 13 may consist of very thin metal plate, for example with a thickness of 0.25 mm. Optimum adaptation of the shape of the electrodes 11, 12, 13 to the shape of the interior space of the probe housing 2 is achieved as a result.

The outer radius of the clamping cone 10 in the regions which are covered by the electrodes 11, 12 and 13 in the installed state is preferably reduced by the thickness of the electrodes 11, 12, 13. This precisely predetermines the position of the electrodes 11, 12, 13.

The clamping cone 10 is preferably arranged in a self-locking manner in the probe housing 2. This is achieved by the angle of taper a of the clamping cone 10 being less than or equal to 7°. The tangent of the angle of taper $\alpha$ is equal to the ratio of the difference between the maximum radius $r_{MAX}$ and minimum radius $r_{MIN}$ of the clamping cone 10 to its length L $$\tan \alpha = (r_{MAX} - r_{MIN})/L$$

In the numerical example given above, this angle is even only 0.6°. The clamping cone 10 is consequently secured in the probe housing 2 and is insensitive to vibrations, such as are produced, for example, by pumps or agitating mechanisms at a measuring location, or by similar causes. Additional fixing of the clamping cone 10 is not absolutely necessary.

In installation, the electrodes 11, 12, 13 are initially pushed onto the clamping cone 10. As can be seen from the exploded representation in FIG. 3, it is necessary here to begin with the electrode 13, which has the largest diameter. The remaining electrodes 12, 11 of the next smallest inside diameter are then each to be successively pushed on. The inside diameter of the electrodes 11, 12, 13 is in this case respectively dimensioned such that the respective electrode 11, 12, 13 is slightly expanded when it is pushed on in its predetermined position on the clamping cone 10. This achieves the effect that the electrodes 11, 12, 13 adhere on the clamping cone 10 by their resilience alone.

The electrodes 11, 12, 13 can each be electrically connected by means of a lead passed through the bore 14 of the clamping cone.

For this purpose, as shown in FIG. 4, the electrodes 11, 12, 13 have a T-shaped portion exposed by punching on one end face of the respective electrode 11, 12, 13. The foot of the T remains connected to the electrode 11, 12, 13 and the crossbar is movable. The electrical connection takes place by the T being bent out from the plane of the electrode 11, 12, 13 and by the crossbar being bent around an insulated conductor of the lead and fastened there by crimping. The lead is then passed through a neighboring clearance 15, 16 in the clamping cone 10 and through the bore 14 out of the probe housing 2 and is connected to an electrical circuit (not shown in the figures). The crimping may be performed before or after the installation of the electrodes 11, 12, 13 on the clamping cone 10.

In the case of a capacitive filling-level limit switch, a coaxial lead which has an inner conductor and an outer conductor gripping coaxially around the latter is preferably provided. The measuring electrode is preferably connected to the inner conductor and the shielding electrode is preferably connected to the outer conductor. This offers the great advantage that the shielding effect is also extended to the lead connected to the measuring electrode.

In the next step, the clamping cone 10 with the electrodes 11, 12, 13 fastened thereupon is to be introduced into the probe housing 2. The clamping cone 10 has at its end having the larger radius a shoulder ring 20, extending radially outward. In the fully installed state, this ring rests on a shoulder surface 21 arranged at the corresponding level in the probe housing 2.

When it is introduced, the clamping cone 10 undergoes a compression in the radial direction, by which the electrodes 11, 12 or 13 located between the clamping cone 10 and the probe housing 2 are pressed against a wall of the probe housing 2 such that they are in surface contact and there are no gaps.

The freedom from gaps is important to the extent that a gap, for example between the measuring electrode 11 and the probe housing 2, has an effect on the measurement result similar to a further capacitance connected in series with the measuring capacitance.

The clamping cone 10 exerts a radially outwardly directed force on the probe housing 2. This gives the probe housing 2 additional stability and strength. Furthermore, the probe housing 2 is in one piece and consequently has not only the mechanical resistance referred to but also a high chemical resistance, depending on the material, which are not reduced by weaknesses, as represented by connection points between two housing parts.

The probe housing 2 is essentially smooth on the inside and outside. This offers advantages, since parts shaped in this way can be produced more easily, for example as injection moldings, and since smooth shapes without shoulders and/or undercuts have a greater mechanical stability.

If required, for example for safety reasons, the cavity remaining in the interior of the probe housing 2 after installation of the clamping cone 10 with the electrodes 11, 12, 13, or a partial space of said cavity defined by an inserted barrier, is filled with a casting compound.

What is claimed is:

1. A probe having
    an essentially rod-shaped probe housing,
        which has an axial, conical interior space,
    a clamping cone which is compressible in the radial direction and
        is arranged in the interior space and
        on which there is arranged at least one sheet-like electrode,
            which is pressed by the clamping cone against a wall of the probe housing such that said electrode is in surface contact and there are no gaps.

2. The probe as claimed in claim 1, in which the clamping cone has
    an axial cylindrical bore and
    clearances which run in the longitudinal direction of the cone and penetrate a wall of the clamping cone and by which the clamping cone is compressible in the radial direction.

3. The probe as claimed in claim 2, in which each end face of the clamping cone is broken through by at least one clearance.

4. The probe as claimed in claim 1, in which the at least one electrode comprises a bent metal plate made of a copper alloy, which adheres to the clamping cone by resilience of the bent metal plate alone.

5. The probe as claimed in claim 1, in which the at least one electrode can be electrically connected to by means of a lead passed through the bore (14) of the clamping cone.

6. The probe as claimed in claim 5, in which the at least one electrode comprises a portion which can be fastened on an insulated conductor of the lead by crimping.

7. The probe as claimed in claim 1, in which the probe housing consists of a chemically highly resistant material which can be used in a wide temperature range, said chemically highly resistant material selected from polyphenylene sulfide (PPS) and polybutylene terephthalate (PBT).

8. The probe as claimed in claim 1, in which the clamping cone consists of a rigid plastic selected from polybutylene terephthatlate (PBT) and a polyamide.

9. The probe as claimed in claim 1, in which the at least one electrode is a measuring electrode of a capacitive filling-level limit switch.

10. The probe as claimed in claim 9, in which there is provided a second electrode, which is a shielding electrode of a capacitive filling-level limit switch.

11. The probe as claimed in claim 10, in which a coaxial lead with an inner conductor and an outer conductor is provided and in which the measuring electrode is connected to the inner conductor and the shielding electrode is connected to the outer conductor.

12. The probe as claimed in claim 9, in which there is provided a further electrode, which is a ground electrode of a capacitive filling-level limit switch.

13. The probe as claimed in claim 10, in which there is provided a further electrode, which is a ground electrode of a capacitive filling-level limit switch.

14. The probe as claimed in claim 11, in which there is provided a further electrode, which is a ground electrode of a capacitive filling-level limit switch.

* * * * *